(12) United States Patent
Mallmann et al.

(10) Patent No.: US 11,518,356 B2
(45) Date of Patent: Dec. 6, 2022

(54) ASSEMBLY FOR A HYDRAULIC BRAKE SYSTEM, AND VEHICLE BRAKE SYSTEM

(71) Applicant: ZF ACTIVE SAFETY GMBH, Koblenz (DE)

(72) Inventors: Markus Mallmann, Pfalzfeld (DE); Marcus Janson, Koblenz (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 200 days.

(21) Appl. No.: 16/766,312

(22) PCT Filed: Nov. 22, 2018

(86) PCT No.: PCT/EP2018/082204
§ 371 (c)(1),
(2) Date: May 22, 2020

(87) PCT Pub. No.: WO2019/105837
PCT Pub. Date: Jun. 6, 2019

(65) Prior Publication Data
US 2020/0391712 A1 Dec. 17, 2020

(30) Foreign Application Priority Data

Nov. 29, 2017 (DE) .......................... 102017011055.7
Jul. 4, 2018 (DE) ............................ 10018005309.2

(51) Int. Cl.
*B60T 11/22* (2006.01)
(52) U.S. Cl.
CPC ..................................... *B60T 11/22* (2013.01)
(58) Field of Classification Search
CPC .......... B60T 11/22; B60T 8/368; B60T 17/06; B60T 13/745; B60T 13/66; B60T 13/142
(Continued)

(56) References Cited

U.S. PATENT DOCUMENTS 10,000,193 B2 6/2018 Han
10,207,690 B2 2/2019 Nakazawa et al.
(Continued)

FOREIGN PATENT DOCUMENTS

DE 102007041500 3/2009
DE 102013001388 A1 7/2014
(Continued)

OTHER PUBLICATIONS

German Search Report for corresponding German Application Serial No. 10 2018 005 309.2, dated Mar. 6, 2019, pp. 1-8.

*Primary Examiner* — Thomas E Lazo
*Assistant Examiner* — Daniel S Collins
(74) *Attorney, Agent, or Firm* — Tarolli, Sundheim, Covell & Tummino LLP

(57) ABSTRACT

The invention relates to an assembly (10) for a hydraulic brake system having a fluid container (12) for a brake fluid, an electronic control unit (14) with a first housing (16), a hydraulic block (18) with a second housing (20), and a brake pressure control device which is arranged at least in sections in the second housing (20), and a fastening device for fastening the fluid container (12) and the electronic control unit (14) to the hydraulic block (18). The second housing (20) has a first fluid connector for connecting to the fluid container (12) and a second fluid connector (24) for connecting to a hydraulic line of the brake system. The brake pressure control device is set up to pressurize the brake fluid. The fastening device has a single-piece connecting element (28) which, in the mounted state of the assembly (10), connects the second housing (20) to the first housing (16) and/or an electric motor (26) of the brake pressure control device.

23 Claims, 11 Drawing Sheets

(58) Field of Classification Search
USPC .......................................................... 60/585
See application file for complete search history.

(56) References Cited

U.S. PATENT DOCUMENTS

| | | |
|---|---|---|
| 2013/0152579 A1 | 6/2013 | Nuemann et al. |
| 2014/0216866 A1 | 8/2014 | Feigel et al. |
| 2015/0068201 A1 | 3/2015 | Nakamura et al. |
| 2015/0158466 A1 | 6/2015 | Nakamura et al. |
| 2015/0360670 A1 | 12/2015 | Lange |
| 2016/0185330 A1 | 6/2016 | Lee et al. |
| 2017/0190328 A1 | 7/2017 | Nakazawa et al. |
| 2018/0065605 A1 | 3/2018 | Leiber et al. |

FOREIGN PATENT DOCUMENTS

| | | |
|---|---|---|
| FR | 2949734 A1 | 3/2011 |
| KR | 20090043219 A | 5/2009 |

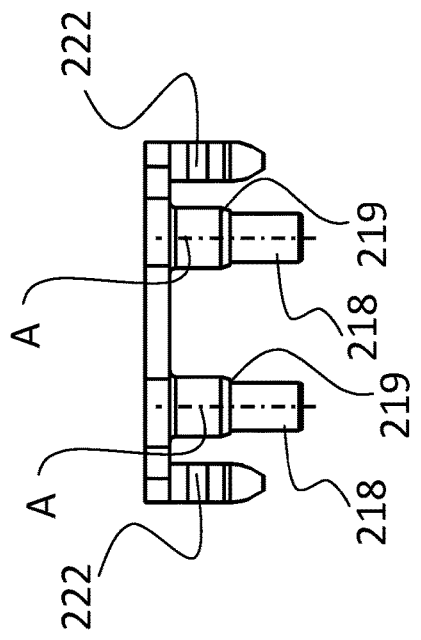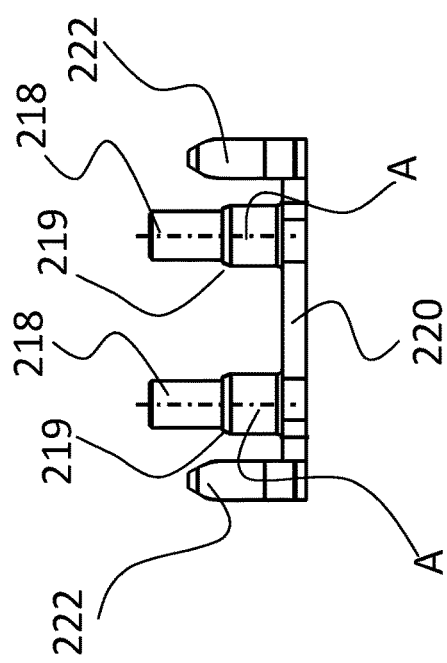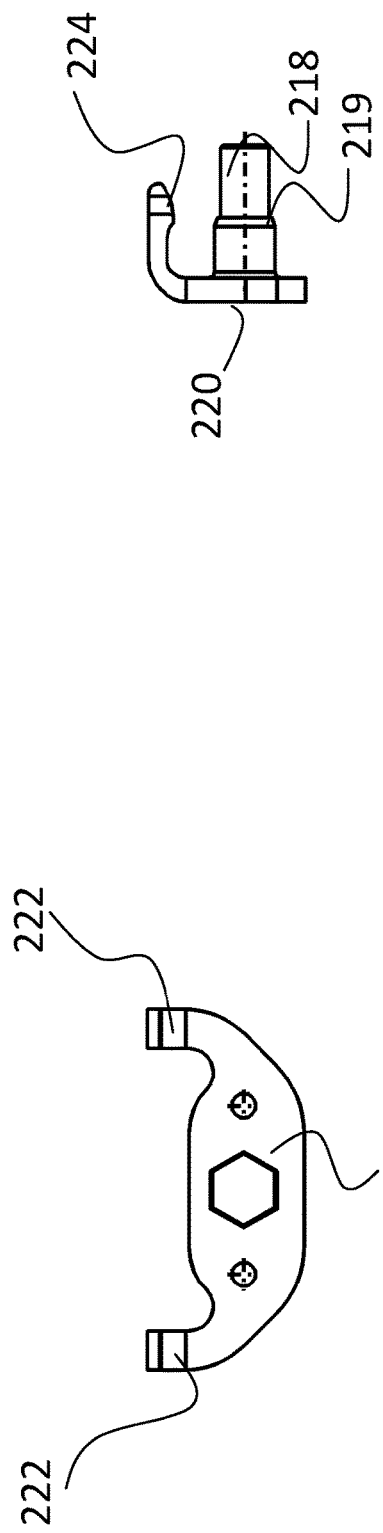
Fig. 16a
Fig. 16b
Fig. 16c
Fig. 16d

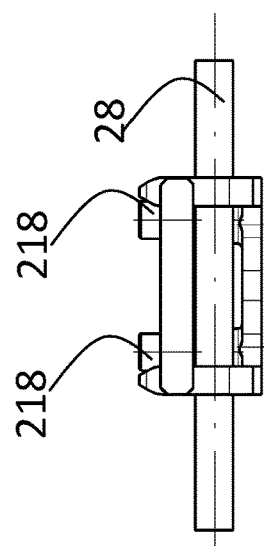
Fig. 19
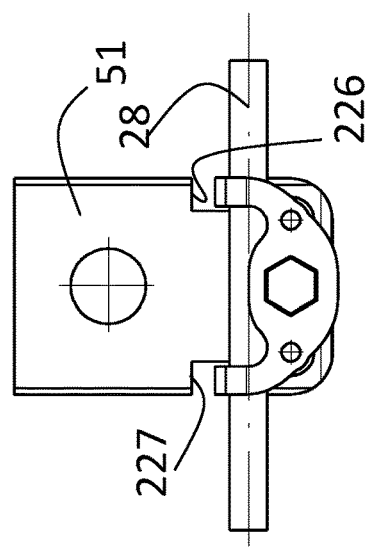
Fig. 21a
Fig. 21c
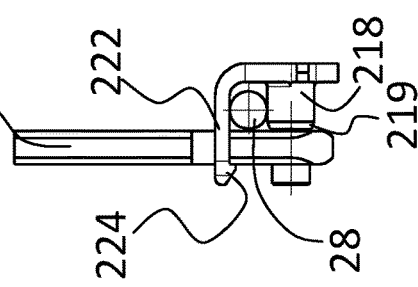
Fig. 21b
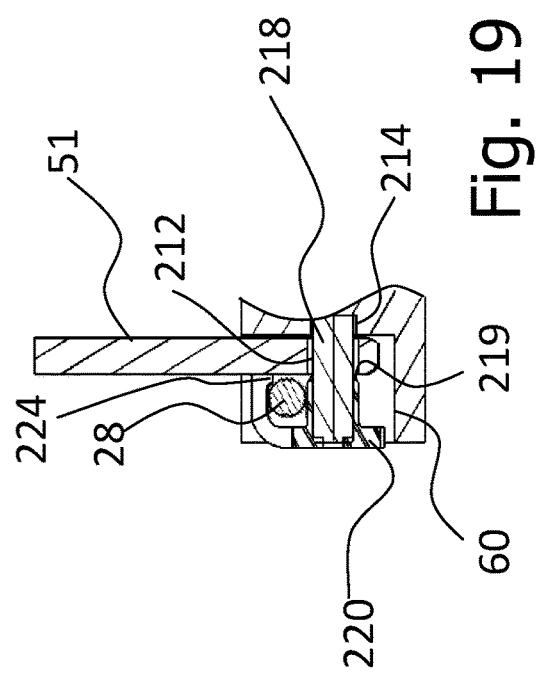
Fig. 20

ASSEMBLY FOR A HYDRAULIC BRAKE SYSTEM, AND VEHICLE BRAKE SYSTEM

RELATED APPLICATIONS

This application corresponds to PCT/EP2018/082204, filed Nov. 22, 2018, which claims the benefit of German Application No. 10 2017 011 055.7, filed Nov. 29, 2017 and German Application No. 10 2018 005 309.2, filed Jul. 4, 2018, the subject matter of which are incorporated herein by reference in their entirety.

BACKGROUND OF THE INVENTION

The present invention relates to an assembly for a hydraulic brake system and to a vehicle brake system having an assembly of this kind.

In order to brake a vehicle, in hydraulic brake systems brake fluid from a fluid container is compressed in a brake master cylinder owing to actuation of a brake pedal (or brake lever), and a brake pressure is thereby built up in the brake lines of one or more brake circuits connected to the wheel brakes. In addition, the hydraulic pressure at the inlet of the master cylinder can be increased by means of a hydraulic brake booster. In order to prevent locking up of a vehicle wheel, the brake pressure acting at the corresponding wheel brake can be selectively reduced by means of a brake pressure control device. For this purpose, the brake pressure control device contains valves, which are controlled by an electronic control device.

In electrohydraulic brake systems, the deflection of the brake pedal out of the rest position thereof is detected with the aid of sensors. From this deflection, a signal is determined by an electronic control unit, optionally with consideration of further relevant parameters, and this signal is fed to an electrohydraulic actuator, which builds up the brake pressure in the brake lines leading to the wheel brakes. In the case of passenger car or truck brake systems known from the prior art, the components comprising the fluid container, the electronic control unit, the brake master cylinder and the brake pressure control device are normally arranged under the engine hood and thus occupy installation space there.

An arrangement of a fluid container on a brake master cylinder is known from document WO 2014/114487 A2, for example, which describes a liquid container that is composed of two hollow bodies welded together. The upper of these hollow bodies has a filling stub, which offers access for replenishment and can be closed by means of a cap. The lower of these hollow bodies has, on the underside thereof, two connection stubs, via which it can be coupled in a known manner in a fluid-conducting and sealed way to the brake master cylinder. Two coupling arms, between which the mounting section of the brake master cylinder is received, are furthermore arranged on the underside of the lower hollow body.

SUMMARY OF THE INVENTION

Given this background situation, it is an object of the present invention to provide a quickly and easily assembled assembly for a hydraulic brake system which requires less installation space and in which a fluid container is coupled in a leaktight manner to a hydraulic block.

This object is achieved by an assembly having the features of claim 1 and by a vehicle brake system having the features of claim 23.

The assembly is intended for a hydraulic brake system, e.g. an electrohydraulic brake system, and comprises a fluid container for a brake fluid, an electronic control unit with a first housing, a hydraulic block with a second housing and a brake pressure control device, which is arranged partially or completely in the second housing, as well as a fastening device for fastening the fluid container and the electronic control unit to the hydraulic block. The second housing has a first fluid port for connection to the fluid container and a second fluid port for connection to a hydraulic line of the brake system. The brake pressure control device is designed to pressurize the brake fluid. The fastening device has a one-piece connecting element, which, in the assembled state of the assembly, connects the second housing to the first housing and/or to an electric motor of the brake pressure control device. In the assembled state of the assembly, the connecting element can furthermore connect the fluid container to the second housing and to the first housing and/or the electric motor. The first housing and the fluid container are preferably attached and/or fastened to the second housing by means of the connecting element.

This assembly can be produced quickly and easily by moving the fluid container and the electronic control unit or electric motor into the end position thereof on the hydraulic block, and connecting them to one another by means of the fastening device and thereby fastening them to the hydraulic block. The fluid container and the electronic control unit or electric motor can thus be fastened to the hydraulic block in a single assembly step. This enables production of the brake system to be made more efficient and enables production costs to be reduced. Moreover, the assembly according to the invention is more compact and therefore requires less installation space. The installation space saved is available to other components of the brake system and/or of the vehicle.

The brake fluid is preferably a brake liquid. The brake fluid can be poured into the fluid container through a filling opening arranged vertically above the hydraulic block in the installation position. The filling opening is preferably formed at an opposite end of the fluid container from the hydraulic block. In one embodiment, the filling opening is arranged in a filling stub of the fluid container which opens into a flat first fluid container section. The first fluid container section is connected via a neck section to the hydraulic block, which preferably has a flange at its end facing the hydraulic block. The flange preferably rests flat on a first surface of the hydraulic block/the second housing in order in this way to produce a connection to the hydraulic block which is leaktight and pressure-resistant for the brake fluid. If the fluid container has, on its side facing the electronic control unit, a depression into which the first housing of the electronic control unit extends, the assembly according to the invention is of even more compact configuration. In the region of the depression, the fluid container can be narrower in a direction parallel to the main direction of extent of the connecting element than outside the depression. The fluid container serves inter alia as an expansion tank for the volume expansion of the brake circuits due to a wear-related change in brake pad thickness.

The hydraulic block is preferably part of a brake circuit of the brake system and is coupled to one or more hydraulic wheel brakes in a fluid-conducting manner in order to activate said brakes. In addition to the second fluid port, it can have further fluid ports, which are configured like the second fluid port and can therefore have any of its features. Moreover, the hydraulic block, in particular the brake pressure control device, can be provided with a brake pressure producing device. The brake pressure producing device can have a brake master cylinder, a pump, in particular a piston pump, and/or a further brake cylinder, the piston of which can be driven by the electric motor. In this case, the brake master cylinder is preferably configured as a tandem brake master cylinder. The brake master cylinder, the pump and/or the further cylinder can each be integrated partially or completely into the second housing. The electric motor can be arranged partially outside the second housing of the hydraulic block. A drive shaft of the electric motor can project into the hydraulic block. In addition to the brake pressure producing device, the brake pressure control device can have (solenoid) valves and a line system in order to selectively control the brake pressure built up by the brake pressure producing device for the second fluid port or the further fluid ports.

The electronic control unit can be provided for the purpose, in particular, of generating electronic control signals from a brake pedal or brake lever deflection detected by sensor means or from a critical vehicle state detected by sensor means. The electronic control unit is preferably coupled (electronically) to the brake pressure control device or the brake pressure producing device in order to transmit the control signals thereto and to activate them accordingly to ensure that the brake fluid is pressurized. In particular, a control signal can be output from the control unit to the electric motor in order to move the piston of a further brake cylinder in a corresponding fashion and thereby produce the brake pressure. Thus, the hydraulic block is designed to control the hydraulic pressure of the brake fluid in the region of the second fluid port, in particular to increase it relative to the ambient pressure. A hydraulic block having these features allows an even more compact construction of the assembly according to the invention.

In one embodiment, the connecting element is a bolt or a rivet. The connecting element can lock the fluid container to the hydraulic block. In particular, the connecting element can pass partially or even completely through the fluid container, the first housing and/or the second housing respectively. The connecting element preferably extends along an edge, in particular an edge between the first surface of the second housing, which faces the fluid container, and a second surface of the second housing, which is at an angle to the first surface. The angle can be between 30° and 150°. The angle is preferably about 90°, i.e. the first surface extends substantially perpendicularly to the second surface. Moreover, the connecting element can extend through a through bore, which is formed in the second housing, extends parallel to the edge and extends from a third to a fourth surface of the second housing, wherein the third surface extends parallel to the fourth surface. The third and/or the fourth surface preferably extend perpendicularly to the first and/or the second surface. In one variant, the electric motor is arranged on the third surface of the second housing, and the electronic control unit is arranged on the opposite, fourth surface of the second housing. An actuating rod provided for coupling the brake pressure control device to a brake pedal or brake lever can project from the hydraulic block through an opening formed in the second surface.

Moreover, the assembly can have one or more further connecting elements, which extend along further edges parallel to the abovementioned edge, which extend between the first surface and a fifth surface opposite the second surface, between the fifth surface and a sixth surface opposite the first surface, or between the second surface and the sixth surface of the second housing, for example. In this case, the second surface is preferably aligned parallel to the fifth surface, and the first surface is preferably aligned parallel to the sixth surface. Each further connecting element can have the same features as the connecting element described above. In particular, the further connecting element can extend through a further through bore, which is formed in the second housing, extends parallel to the associated further edge and extends from the third to the fourth surface of the second housing. To this extent, the connecting elements preferably extend parallel to one another.

If the connecting element is a bolt with an external thread, provision can be made for an internal thread, e.g. a drill hole with an internal thread or a nut, to be formed in or on the first housing. It is preferable if at least a section of the connecting element/bolt is received in this internal thread. The connection between the connecting element and the internal thread furthermore advantageously serves to fasten two housing parts of the first housing of the electronic control unit to one another. A head section of the bolt can rest against the third surface, and the bolt can extend through the through bore extending parallel to the edge and into the drill hole with the internal thread aligned with the through bore extending parallel to the edge. For a design which saves installation space, the third surface can have a depression in which the head section is accommodated in the assembled state.

In one variant, the fastening device has one or more fastening extensions, each of which can engage in a corresponding recess formed in the second housing. Each of the recesses is preferably arranged in the region of an edge of the second housing and is open toward the first surface, toward the second surface and/or toward the fifth surface of the second housing. Starting from the first surface at the edge between the first surface and the second surface, a first recess preferably extends parallel to the second surface into the material of the second housing.

The first recess extends so far into the second housing that the through bore is completely exposed, for example. In other words, the depth of the recess, starting from the first or second surface, is preferably as great as or greater than the distance between each of these surfaces and the through bore plus the diameter of the through bore. Similarly to the first recess, one or more second recesses can extend into the material of the second housing parallel to and along the edge, at a distance from the first recess.

In analogous fashion, additional recesses can be arranged on the further edge between the first surface and the fifth surface of the second housing. Starting from the first surface at the edge between the first surface and the fifth surface, it is possible, in particular, for each of these additional recesses to extend parallel to the fifth surface into the material of the second housing. These recesses too extend so far into the material that the respective through bore is completely exposed. In other words, the depth of the recess, starting from the first or fifth surface, is as great as or greater than the distance between each of these surfaces and the through bore plus the diameter of the through bore. The first and the second recess as well as the additional recesses can be arranged symmetrically with respect to one or more central planes of the second housing.

The fastening extensions are configured in such a way that they correspond to the recesses, i.e. they are arranged in a manner corresponding to the recesses. It is preferable if each fastening extension projects laterally from the fluid container and extends by means of its end section beyond the fluid container base surface in contact with the hydraulic block. This end section can engage in the respectively corresponding recess. It preferably contains a hole, through which the connecting element passes in the assembled state, whereby the connecting element locks the respective fastening extension in the associated recess and thereby locks the fluid container to the hydraulic block. The hole can in each case be configured as a bore spaced apart from the edge of the fastening extension, and it therefore has a continuous inner circumferential surface. Some of the fastening extensions can be arranged on opposite sides of the fluid container to match the arrangement of the recesses.

In another embodiment, one or more of these fastening extensions can be formed integrally with the fluid container and/or can be arranged adjacent to the hydraulic block. Each of the fastening extensions is preferably produced in one piece together with the fluid container. This can be accomplished in a simple manner by joint injection molding of the fluid container and the fastening extensions.

As an alternative, it is conceivable for the fastening device to have a separate frame, which is arranged on an end of the fluid container which faces the hydraulic block. In this case, the frame can be designed as a separate component and/or can have the same cross-sectional shape as that end of the fluid container which faces the hydraulic block. In order to provide a leaktight connection between the fluid container and the hydraulic block, the flange formed on the end of the fluid container rests on the hydraulic block. The frame can then press the flange onto the hydraulic block.

One or more of the fastening extensions can be formed integrally with the frame. For example, any of these fastening extensions can be fastened to the frame, in particular being welded or bonded thereto, or can be produced in one piece with the frame. Furthermore, any of the fastening extensions can project laterally, in particular radially outward, from an outer peripheral surface of the frame. Each fastening extension preferably furthermore extends away from the liquid reservoir in a direction perpendicular to the first surface of the second housing. Irrespective of whether the fastening extensions are arranged on the frame or directly on the fluid container, the connecting element can pass through one or more of the recesses and/or through one or more of the fastening extensions. The connecting element preferably passes through the fastening extensions in regions which engage in the recesses.

In a development, at least one of the fastening extensions has a through opening. This fastening extension can be designed as a flat tab, for example, which preferably extends in a main plane parallel to the main direction of extent of the connecting element. The fastening extension can extend vertically downward in the direction of the hydraulic block from the fluid container in the installed position. In particular, the through opening can be arranged adjacent to an end of the fastening extension facing the hydraulic block. The through opening preferably extends through the flat tab, substantially perpendicularly to the main plane of the latter. The through opening can be a drill hole, for example.

The hydraulic block can have a hole which is open toward the recess, and the fastening device can have a coupling element having at least one locking bar. The hole open toward the recess is preferably designed as a blind hole, most preferably as a blind drill hole. In the assembled state of the assembly, the hole is preferably in alignment with the through opening along a central longitudinal axis of the locking bar, i.e. the center of the through opening and the center of the hole lie concentrically on the central longitudinal axis. In this case, the locking bar can pass through the through opening and can be in engagement with the hole. To this extent, the coupling element is preferably connected positively to the fastening extension and the hydraulic block. The locking bar is therefore preferably configured in a manner complementary to the hole open toward the recess in the end region of said locking bar facing away from the base section. If this hole is designed as a bore, the locking bar therefore preferably has a cylindrical shape in its end region. The locking bar can furthermore have a stop surface, which extends along its outer peripheral surface. The stop surface can be arranged in such a way that it rests against the fastening extension or against the hydraulic block when the assembly is fully assembled.

The coupling element can be designed as a separate component. In particular, it is envisaged that the coupling element is formed separately from the connecting element, from the fastening extension and/or from the hydraulic block. This has the advantage, in particular, that the coupling element can be produced easily, quickly and cheaply in large numbers. Moreover, the assembly with this coupling element can be produced even more easily since the fastening extension (and thus the fluid container) can be mounted on the hydraulic block after the hydraulic block has been coupled to the electronic control unit or the electric motor by means of the connecting element. In particular, it is not necessary to move the fluid container into its end position on the hydraulic block before the one-piece connecting element is inserted.

The coupling element preferably has a retention device, which is designed to hold the locking bar in engagement with the hole in the assembled state of the assembly. The retention device thus prevents unwanted release of the coupling element after assembly has been carried out. The retention device is preferably reversible, i.e. it is releasable to enable the locking bar to be removed from the through opening in order to free the fastening extension. This makes it possible to remove and possibly replace the fluid container quickly and easily when required. The retention device can engage on the connecting element, on the fastening extension and/or on the second housing, in particular with a latching action. For this purpose, the retention device is preferably provided with at least one latching arm, which is connected to the locking bar via a base section and which extends substantially parallel to the central longitudinal axis of the locking bar, for example. In a preferred embodiment, the latching arm is arranged at a distance from the locking bar, in particular along the surface of the base section. The latching arm can be of elastic and/or clip-type design, at least in some section or sections. The latching arm can furthermore be configured in such a way that it engages on the connecting element in the assembled state of the assembly. For this purpose, the latching arm can have a latching nose, which is preferably arranged at a greater distance from the base section of the coupling element than the connecting element and/or at a shorter distance than the fastening extension in the assembled state. Alternatively, the latching arm can engage on the fastening extension. In particular, the latching arm can engage behind the fastening extension in order to secure the coupling element on the fastening extension and, at the same time, to hold the locking bar in the hole.

The base section can be configured in a manner complementary to the recess. In this case, the coupling element can be accommodated in the recess in the assembled state of the assembly. In the assembled state of the assembly, the connecting element can be arranged between the base section and the fastening extension and/or between the latching arm and the locking bar. The connecting element thus forms a stop resistance for the locking bar in order to prevent the fastening extension from being pulled out of the recess.

If the coupling element has a plurality of locking bars, each of them can be configured like the locking bar described above and, in the assembled state of the assembly, can pass through a through opening, associated with the respective locking bar, in the fastening extension and engage in a hole associated with the respective locking bar and open toward the recess. This/these through opening/s and this hole or these holes can have each of the features of the through opening described above and of the hole described above. In particular, all the locking bars, through openings and holes can extend parallel to one another. In the case of a coupling element that has a plurality of locking bars, the locking bars are preferably arranged equidistantly from the center of the base section.

Moreover, irrespective of whether it has one or more locking bars, the coupling element can be provided with a plurality of latching arms, which are preferably positioned spaced apart from one another. Each of the latching arms can have one or more of the features of the latching arm described above, in particular can be provided with a latching nose. The locking bar/s is/are arranged closer to the center of the base section than the latching arms when viewed parallel to a main plane of the base section. A central longitudinal axis of the connecting element is preferably aligned perpendicularly to the central longitudinal axis of the locking bar when the assembly is in the assembled state thereof.

To install the fluid container on the hydraulic block, the fastening extension is preferably first of all introduced into the recess in a first direction substantially perpendicular to the central longitudinal axis of the connecting element, with the result that the through opening is in alignment with the hole open toward the recess. The coupling element is then inserted into the recess, wherein the locking bar is introduced into the through opening. During this process, the latching nose of the latching arm comes to rest against the connecting element or the fastening extension. If the coupling element is moved further into the recess, the latching arm is deformed and latches in on the side of the connecting element or of the fastening extension which faces away from the base section. In this end position, the stop surface preferably rests against the fastening extension and pushes this extension in the direction of the hydraulic block, parallel to the central longitudinal axis of the locking bar. The fastening extension is thereby prevented from moving along or transversely to the central longitudinal axis of the locking bar. In order to remove the fluid container from the hydraulic block, the coupling element can be prised out of the recess by means of a flat screwdriver, for example, wherein the latching arm is once again preferably deformed elastically.

As mentioned above, it is possible, in the assembled state of the assembly, for the connecting element to connect the fluid container the first housing, the second housing and the electric motor of the brake pressure control device to one another. For this purpose, a housing of the electric motor preferably has a housing flange, which extends parallel to the third surface. The electric motor, in particular the housing flange, can rest on the third surface. The housing flange is advantageously provided with one or more bore/s, which pass through it in a direction perpendicular to the third surface. At least one of the bores is preferably arranged in the region of a corner of the housing flange and can be in alignment with the through bore and/or the drill hole. The connecting element can pass through this bore. If the connecting element is designed as a bolt, the head section thereof preferably rests against a housing flange surface situated opposite the third surface in order to hold the housing flange on the second housing.

In an alternative embodiment of an assembly, the one-piece connecting element connects the fluid container, the electric motor of the brake pressure control device and the second housing to one another in the assembled state of the assembly. In this embodiment, the electric motor and the fluid container are preferably attached and/or fastened to the second housing by means of the connecting element. The connecting element can be arranged at a distance from the first housing, and the first housing can be attached/fastened to the second housing by additional connecting means.

A vehicle brake system has an assembly described in detail above. Moreover, the vehicle brake system can have a line system comprising one or more hydraulic lines, each of which can be connected to a wheel brake of the brake system. The hydraulic lines are preferably designed to transmit the pressure produced in the brake pressure control device to the wheel brake/s in order to actuate the wheel brake.

BRIEF DESCRIPTION OF THE DRAWINGS

Preferred embodiments of an assembly for a hydraulic brake system are now explained in greater detail with reference to the attached schematic drawings, in which

FIGS. 16*a-d* show the coupling element of the assembly from FIG. 14 in various side views;

FIG. 17 shows the assembly from FIG. 14 in a perspective partial view, wherein the coupling element is in contact with the connecting element without being latched in;

FIG. 19 shows part of the assembly from FIG. 14 in a cross-sectional view containing the central longitudinal axis of the locking bar;

FIG. 20 shows the coupling element, the fastening extension and the connecting element of a sixth embodiment of an assembly in a perspective detail view, wherein the assembly is in the assembled state; and FIGS. 21a-c show the coupling element, the fastening extension and the connecting element of the assembly from FIG. 20 in detailed side views, wherein the assembly is in the assembled state.

DESCRIPTION

Figure 2:
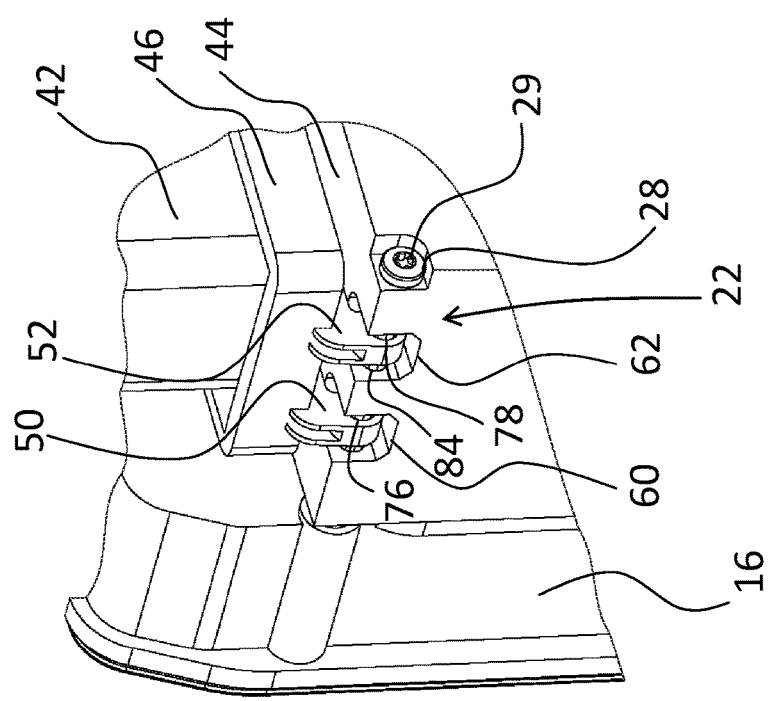
FIG. 2 shows the assembly from FIG. 1 in the region of the fastening device in a perspective detail view.
Figure 1:
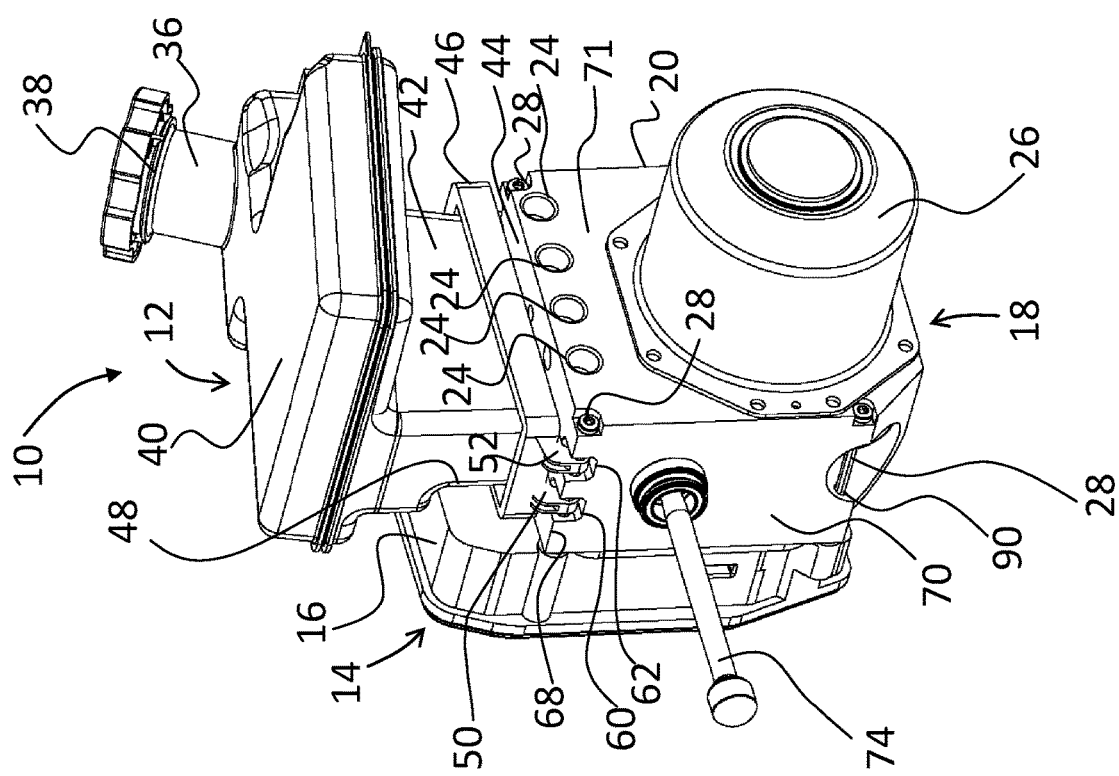
FIG. 1 shows a first embodiment of an assembly in a perspective overall view from the front.

FIGS. 1 to 6 show a first embodiment of an assembly 10 for a hydraulic brake system. The assembly 10 comprises a fluid container 12 for a brake fluid, an electronic control unit 14 with a first housing 16, a hydraulic block 18 with a second housing 20, and a fastening device 22 for fastening the fluid container 12 and the electronic control unit 14 to the hydraulic block 18 via the first housing 16. The second housing 20 has a first fluid port (not shown) for connection to the fluid container 12, and a plurality of second fluid ports 24, each of which is coupled in a fluid-conducting way to a respective brake circuit, which contains one or more wheel brakes. A section of a brake pressure control device, which has an electric motor 26, is integrated into the second housing 20. As an alternative, the brake pressure control device can be fully integrated into the second housing 20. The brake pressure control device is designed to control the pressure of the brake fluid in the region of the second fluid ports 24. In particular, the electric motor 26 is designed, in response to activation by means of a control signal output by the electronic control unit 14, to pressurize the brake fluid at the second fluid ports 24 when required.

Figure 4:
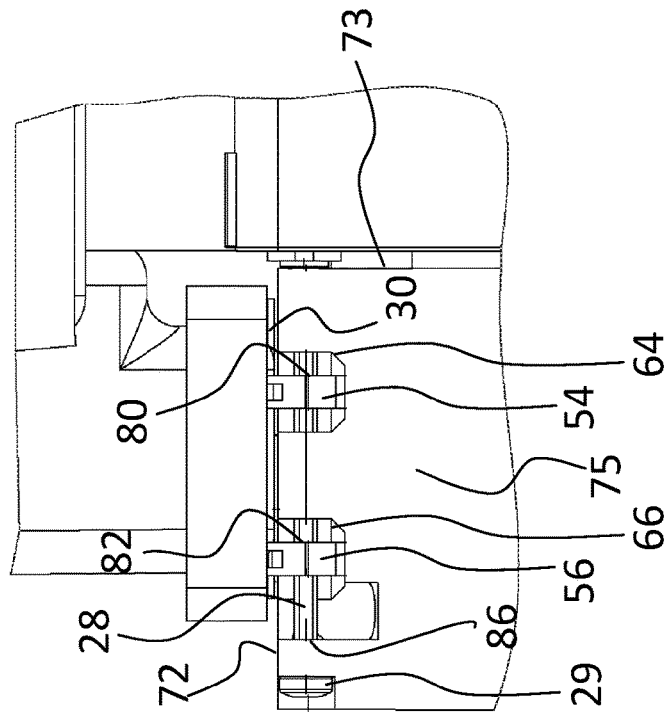
FIG. 4 shows the assembly from FIG. 1 in the region of the fastening device in a detailed rear view.
Figure 3:
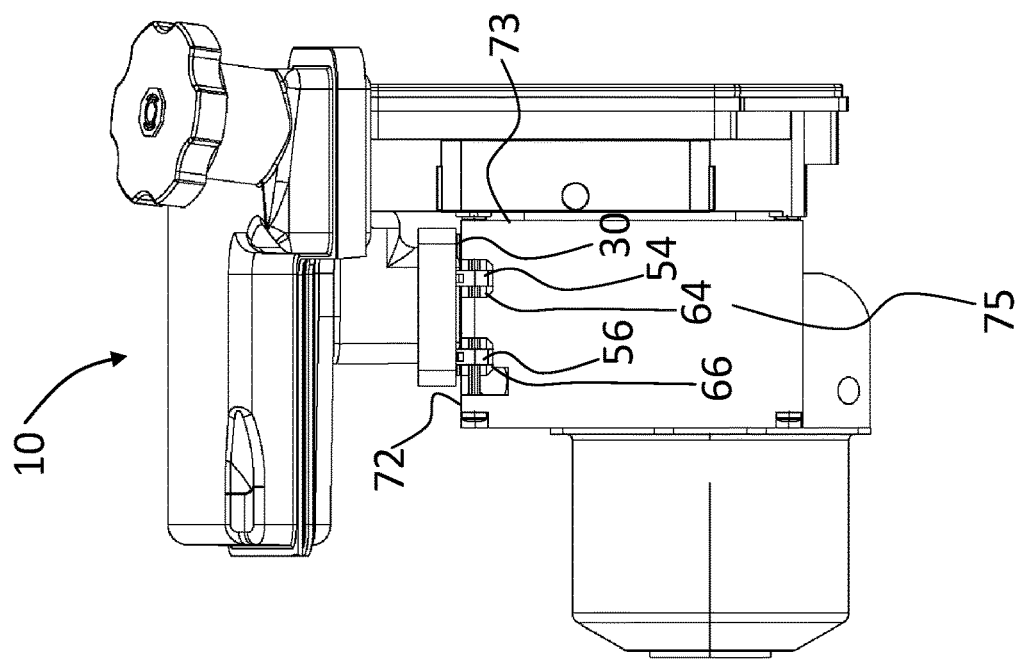
FIG. 3 shows the assembly from FIG. 1 in a rear view.
Figure 6:
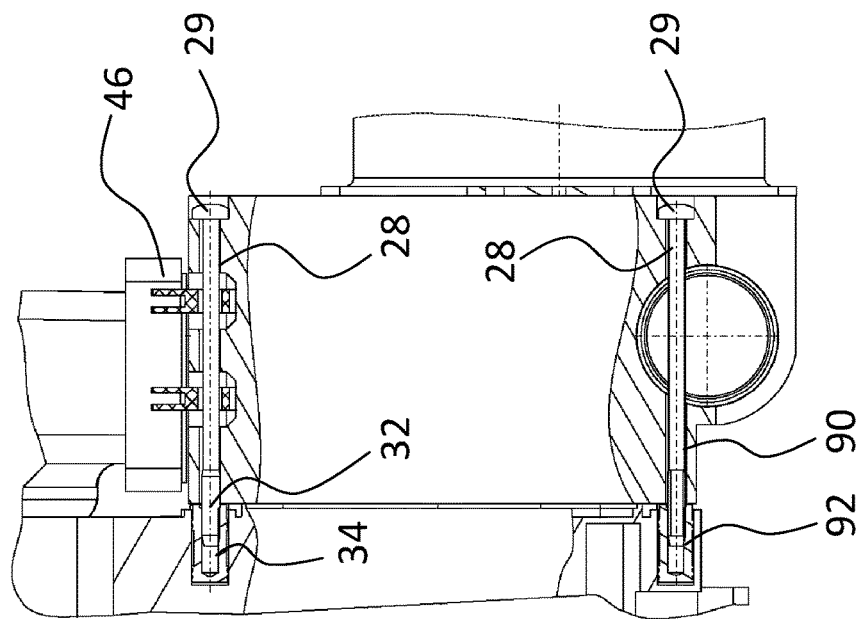
FIG. 6 shows the assembly from FIG. 1 in a detailed front view with the fastening device illustrated in section.
Figure 5:
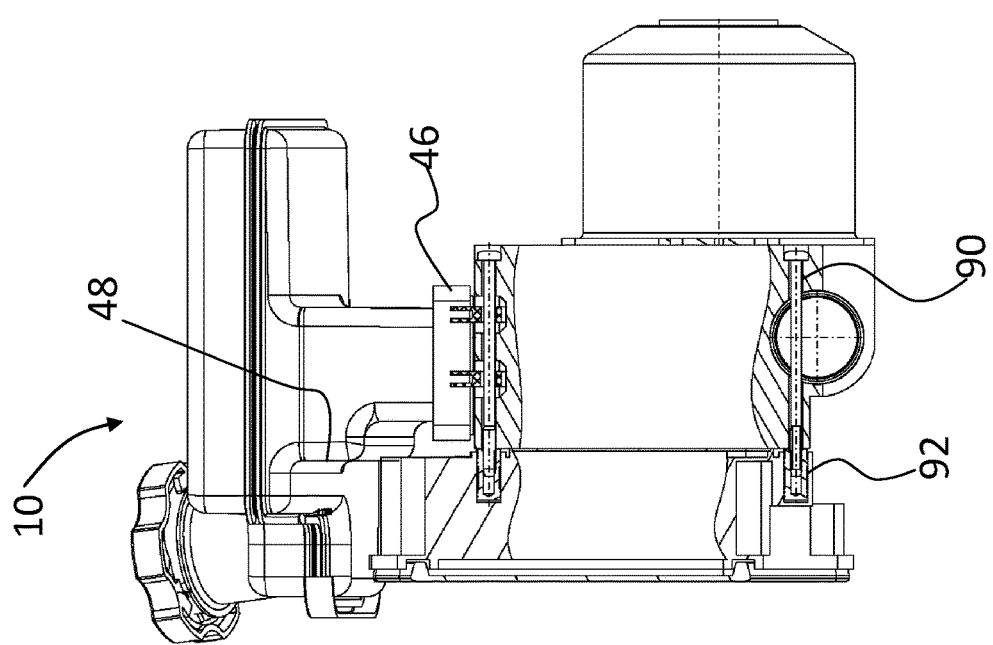
FIG. 5 shows the assembly from FIG. 1 in a front view, wherein parts of the first and second housing are illustrated in section in the region of the fastening device.

As illustrated more precisely in FIGS. 2 to 4, the fastening device 22 has a plurality of integrally formed connecting elements 28 in the form of bolts or screws with a bolt head 29 and a thread 32 (see FIG. 6), e.g. an external thread, which is provided on that end of the connecting element 28 which faces the electronic control unit 14. The connecting elements 28 resemble one another in respect of construction and interaction with the other components of the assembly 10. The connecting elements 28 each pass through the second housing 20, are in engagement with the first housing 16 and thereby fasten the fluid container 12 and the electronic control unit 14 to the hydraulic block 18.

The fluid container 12 has a filling stub 36 with a filling opening 38, said stub emerging in a flat first fluid container section 40 and being connected via a neck section 42 to the hydraulic block 18. In the assembled state, a flange 30, which is arranged at the end of the neck section 42 which faces the hydraulic block 18, rests on a first surface 44 of the second housing 20, preferably in a sealing manner, said first surface facing the fluid container 12. A seal, e.g. an O-ring, can optionally be provided between the flange 30 and the first surface 44. A frame 46 of the fastening device 22 is designed as a separate component and, in the loose state of the assembly 10, can be moved along the neck section 42, wherein it surrounds the neck section 42 at all times. In the assembled state, the frame 46 presses the flange 30 against the first surface 44 in order to seal off the connection between the hydraulic block 18 and the fluid container 12. Along its periphery, the flange 30 in this case extends parallel to the first surface 44, in a gap between the frame 46 and the first surface 44. The neck section 42 is configured with a depression 48 on its side facing the electronic control unit 14, into which depression the first housing 16 of the electronic control unit 14 extends (cf. FIG. 5).

The second housing 20 furthermore has a first edge 68, which extends between the first surface 44 and a second surface 70, which is aligned perpendicularly to the first surface 44. As explained in greater detail below, each connecting element 28 extends through a through bore, which is formed in the second housing 20 and which extends from a third surface 71 of the second housing 20 as far as a fourth surface 73 of the second housing 20, wherein the third surface 71 extends parallel to the fourth surface 73, and the third and the fourth surface 71, 73 extend perpendicularly to the first and second surface 44, 70. Here, by way of example, the electric motor 26 is arranged on the third surface 71. Here, the electronic control unit 14 is arranged on the opposite fourth surface 73. An actuating rod 74 provided for coupling the brake pressure control device to a brake pedal or brake lever projects from the second housing 20 through an opening formed in the second surface 70.

The fastening device 22 furthermore has four fastening extensions 50, 52, 54, 56, each of which engages in a recess 60, 62, 64, 66 formed in the second housing 20 and corresponding to the respective fastening extension 50-56. Here, the spacing between the fastening extensions 50, 52 and 54, 56, respectively, is chosen so that each fastening extension 50 to 56 can be accommodated (preferably centrally) in the associated recess 60 to 66 in the assembled state of the assembly.

The first and second recess 60, 62 are arranged at the first edge 68 and extend from the first surface 44, along the second surface 70, into the material of the second housing 20, and therefore these recesses 60, 62 are open toward the first and second surface 44, 70. The third and fourth recess 64, 66 are formed at a second edge 72, which extends between the first surface 44 and a fifth surface 75 parallel to the second surface 70, and extend from the first surface 44, along the fifth surface 75 into the material of the second housing 20, and therefore the third and fourth recess 64, 66 are open toward the first and fifth surface 44, 75. Thus, starting from the first edge 68, the first and the second recess 60, 62 and, starting from the second edge 72, the third and fourth recess 64, 66 extend into the hydraulic block 18 in the direction of the center of the latter. Here, each recess 60-66 is spaced apart from the third and fourth surface 71, 73 and thus, in particular, from the electronic control unit 14.

Particularly from FIGS. 2 to 4, it can be seen that the extent of each fastening extension 50-56 in a direction parallel to the edge 68, 72 at which the associated recess 60-66 is arranged is less than the extent of the associated recess 60-66, and therefore the fastening extensions 50-56 can be fitted easily into the recesses 60-66. The assembly of the assembly 10 is thereby made even easier. Moreover, the fastening extensions 50-56 are formed integrally with the frame 46 and, starting from the frame 46, extend in the direction of the hydraulic block 18 in the assembled state. Thus, the fastening extensions 50-56 extend beyond an end of the neck section 42 facing the hydraulic block 18 in a section plane aligned perpendicularly to one or more connecting elements 28, when viewed in the direction of the hydraulic block 18, in order to be able to engage in the recesses 60-66.

The fastening extensions 50, 52 each have a hole 76, 78 extending parallel to the first edge 68, and the fastening extensions 54, 56 each have a hole 80, 82 extending parallel to the second edge 72. Moreover, a first through bore 84, which extends adjacent and parallel to the first edge 68, and a second through bore 86, which extends adjacent and parallel to the second edge 72, pass through the second housing 20.

One of the connecting elements 28 passes through the first through bore 84, the first and the second recess 60, 62 and the holes 76, 78 in the fastening extensions 50, 52 and finally engages in the internal thread 34 of the electronic control unit 14. A further connecting element 28 passes through the second through bore 86, the third and the fourth recess 64, 66 and the holes 80, 82 in the fastening extensions 54, 56 and finally engages in an internal thread (not shown in the figures) of the electronic control unit 14, which extends parallel to the internal thread 34. In this way, the connecting element 28 can lock the fluid container 12 to the hydraulic block 18.

Further connecting elements 28, which pass through the second housing 20 in further through bores 90 extending perpendicularly to the third surface 71 and respectively engage in a corresponding further internal thread 92 of the first housing 16, are furthermore provided in the assembly 10. These connecting elements serve to connect the first housing 16 to the second housing 20.

In order to fasten the fluid container 12 and the electronic control unit 14 to the hydraulic block 18, the fluid container 12 is first of all placed on the hydraulic block 18, and the frame 46 is moved in the direction of the hydraulic block 18 until the fastening extensions 50-56 engage to a sufficient depth in the recesses 60-66. All the connecting elements 28 are then inserted into the corresponding through bores 84, 86, 90 and screwed into the internal threads 34, 92 of the first housing 16. Thus, the electronic control unit 14 and the fluid container 12 can be connected to one another quickly and easily, substantially in a single assembly step.

Figure 7:
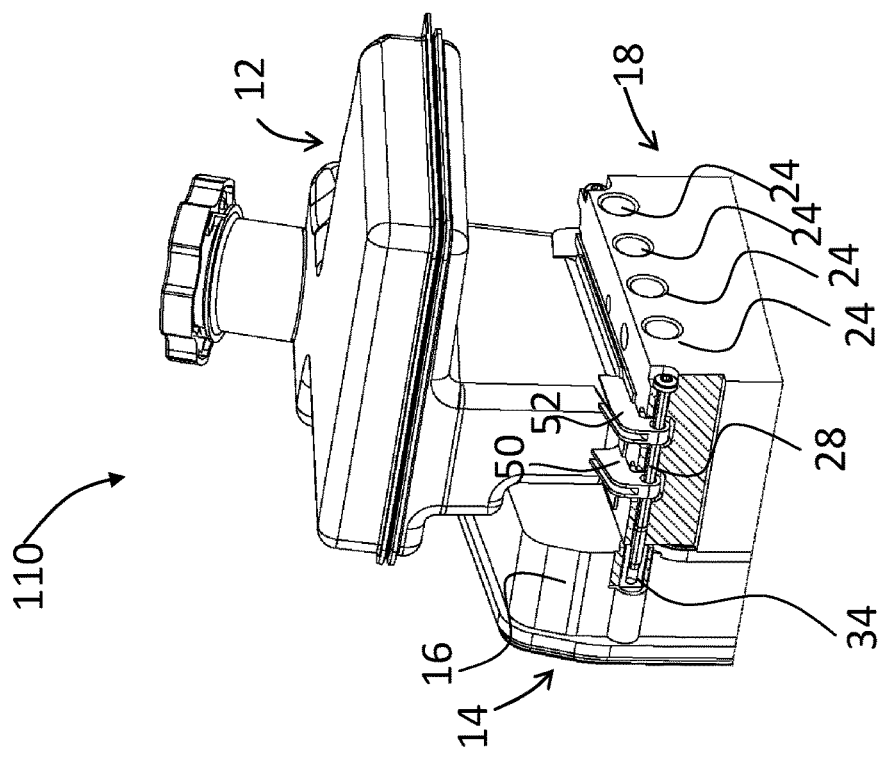
FIG. 7 shows a second embodiment of an assembly in a perspective overall view from the rear.
Figure 8:
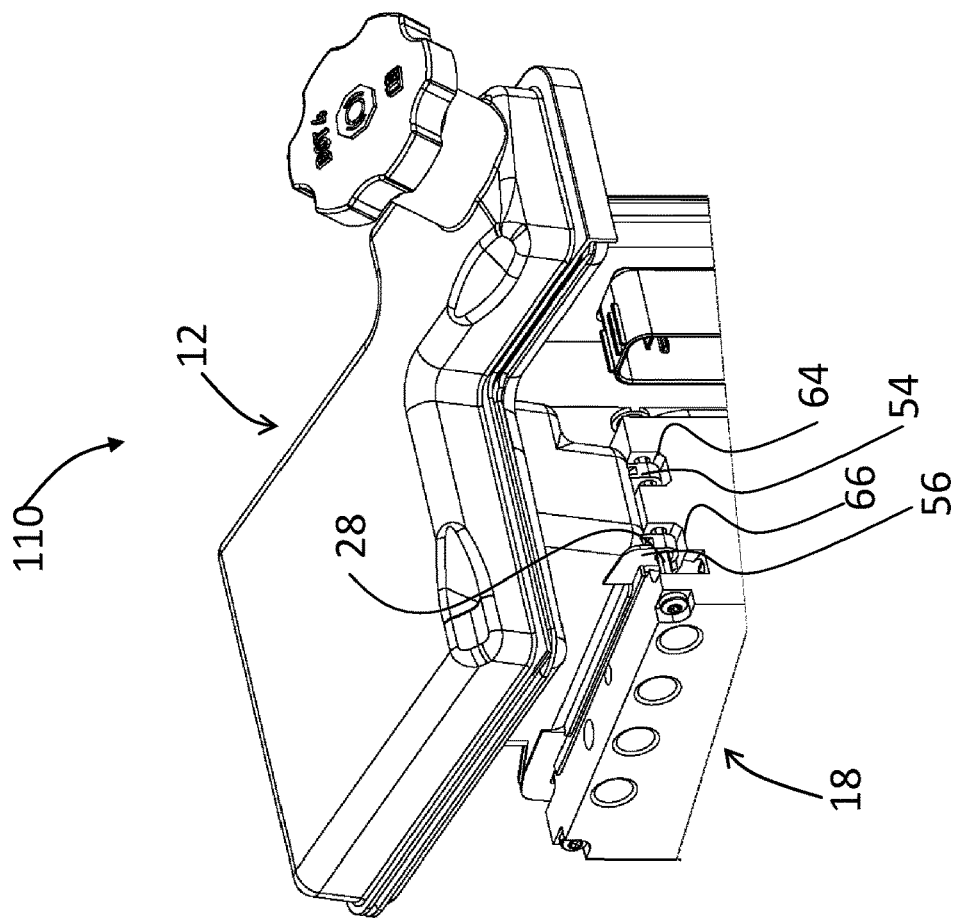
FIG. 8 shows the assembly from FIG. 7 in a perspective overall view with the second housing and part of the first housing in the region of the fastening device illustrated in section.

An assembly 10 according to a second embodiment, which is shown in FIGS. 7 and 8, differs from the assembly 10 shown in FIGS. 1 to 6 in that each of the fastening extensions 50-56 is formed integrally, in particular in one piece, with the fluid container 12. In other words, each fastening extension 50-56 is formed directly on the fluid container 12. However, as described above, the fluid container 12 can be mounted on the hydraulic block 18 by means of the fastening device 22 without the aid of a separate frame 46. Since, in this embodiment, the frame 46 is dispensed with, this assembly can be produced more easily and at lower cost. In other respects, the assembly 10 from FIGS. 7 and 8 has all the features of the assembly 10 from FIGS. 1 to 6.

Figure 10:
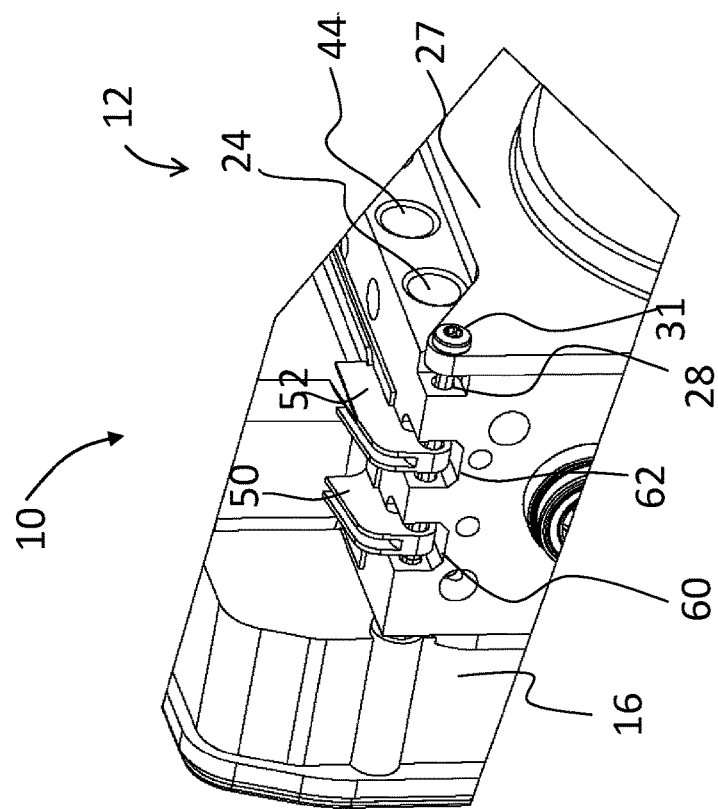
FIG. 10 shows the assembly from FIG. 9 in the region of the fastening device in a perspective detail view.
Figure 9:
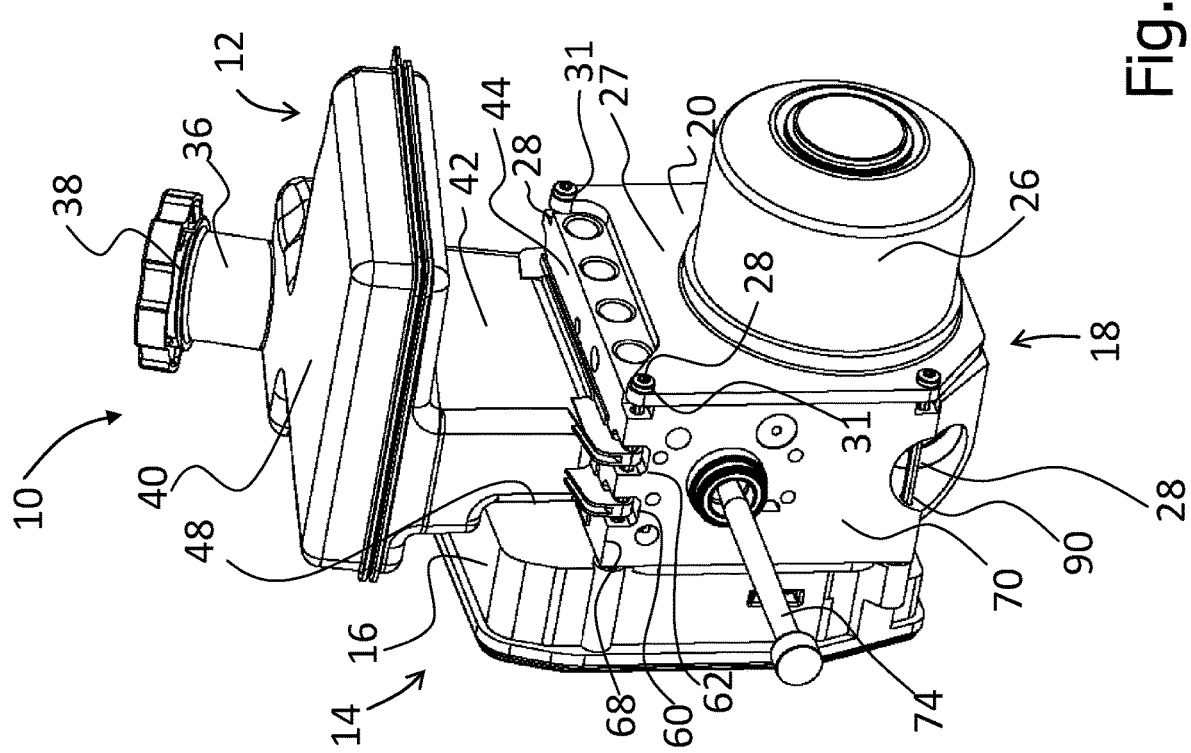
FIG. 9 shows a third embodiment of an assembly in a perspective overall view from the front.
Figure 12:
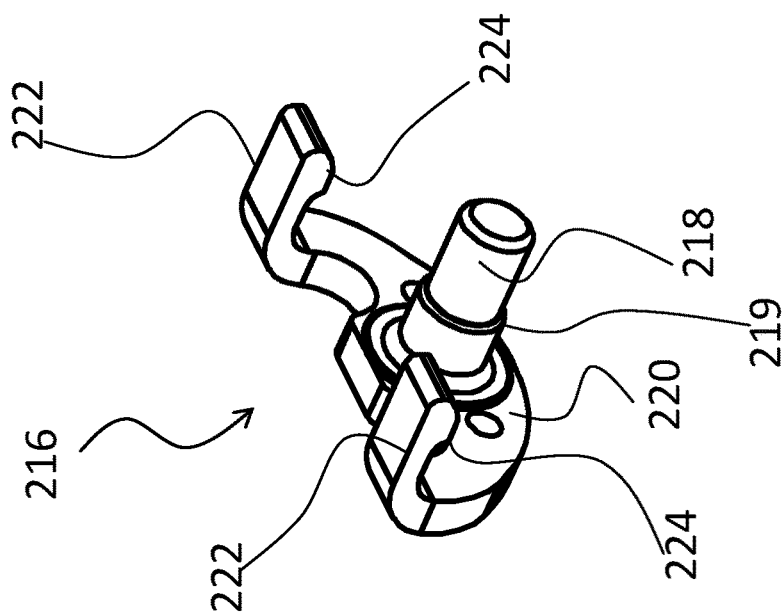
FIG. 12 shows the coupling element of the assembly from FIG. 11 in a perspective detail view viewed in the direction of the locking bar.

An assembly 10 according to a third embodiment, which is shown in FIGS. 9 and 10, differs from the assembly 10 shown in FIGS. 7 and 8 in that the respective connecting element 28 additionally connects the electric motor 26 of the brake pressure control device to the fluid container 12, the first housing 16 and the second housing 20 in the assembled state of the assembly 10. For this purpose, a housing of the electric motor 26 has a housing flange 27, which extends parallel to the third surface 71. The housing flange 27 is in contact with the third surface 71 and has a plurality of bores 31, which pass through it in a direction perpendicular to the third surface 71. Each of the bores 31 is arranged in the region of a corner of the housing flange 27 and is in alignment with the corresponding through bore and the corresponding drill hole. Each bore 31 is penetrated by one of the connecting elements 28. The head section of the connecting element 28 rests against a surface of the housing flange 27 situated opposite the third surface 71 in order to hold the housing flange 27 on the second housing 20. In other respects, the assembly 10 from FIGS. 9 and 10 has all the features of the assembly 10 from FIGS. 7 and 8.

An assembly 10 according to a fourth embodiment, which is shown in FIGS. 11, 12 and 13a-d, differs from the assembly 10 shown in FIGS. 7 to 10 in that, instead of the four fastening extensions 50-56, just one fastening extension 51 configured as a flat tab, through which the connecting element 28 does not pass, is provided. A main plane E of the fastening extension 51 extends substantially parallel to the main direction of extent and the central longitudinal axis of the connecting element 28 and perpendicularly to the first surface 44 of the hydraulic block 18 facing the fluid container 12. The fastening extension 51 has a through opening 212, which is arranged adjacent to an end of the fastening extension 51 facing the hydraulic block 18 and extends perpendicularly to the main plane E through the fastening extension 51. Here, by way of example, the through opening 212 is designed as a drill hole.

Figure 13A:
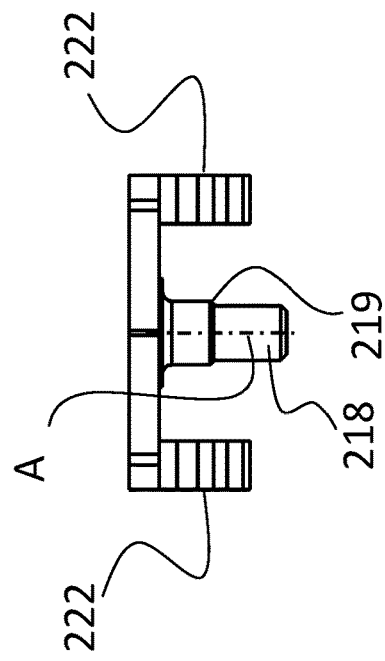
FIGS. 13*a-d* show the coupling element of the assembly from FIG. 11 in various side views.
Figure 13B:
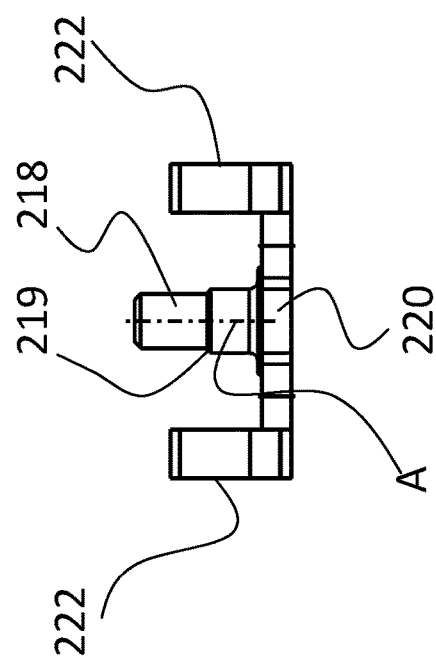
Figure 13C:
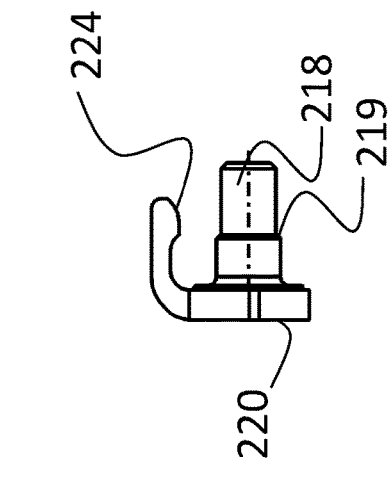
Figure 13D:
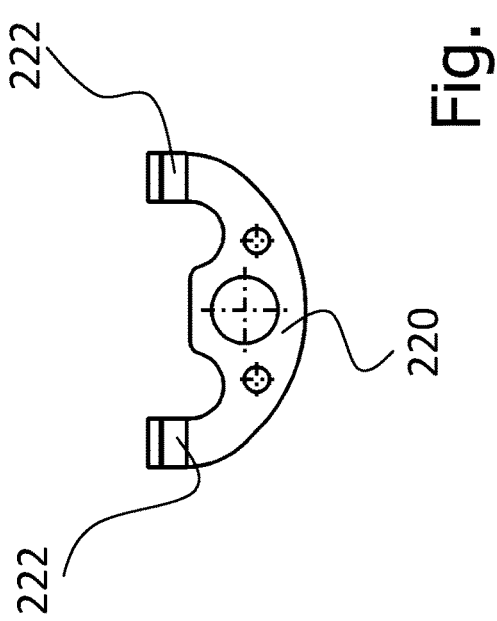
Figure 15:
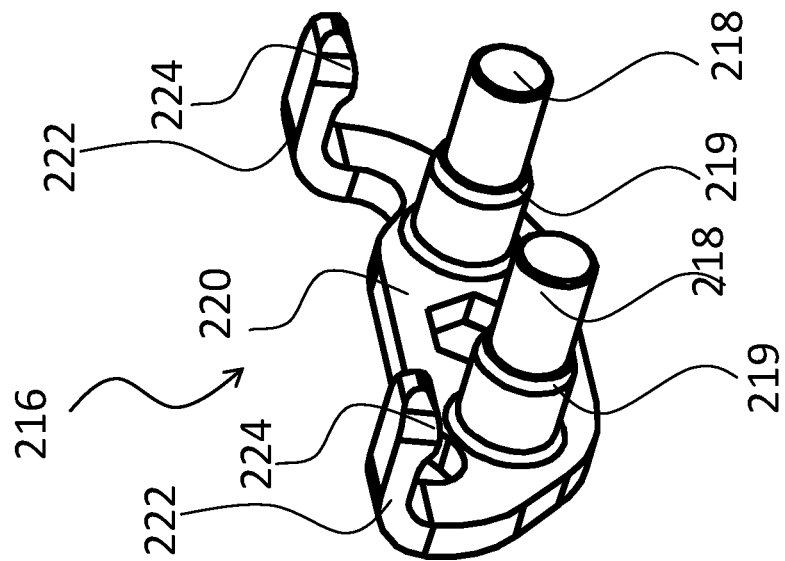
FIG. 15 shows the coupling element of the assembly from FIG. 14 in a perspective detail view viewed in the direction of the locking bar.

The fastening device 22 furthermore has a separate coupling element 216 with a locking bar 218 and two elastic latching arms 222, which are connected to the locking bar via a base section 220 of the coupling element 216. As illustrated in FIGS. 13a, 13b and 13d, the locking bar 218 and the two latching arms 222 project substantially perpendicularly from the base section 220, extend parallel to one another and are spaced apart. Each of the latching arms 222 is shorter in a direction perpendicular to the base section 220 than the locking bar 218 and, at its end facing away from the base section 220, has a latching nose 224, which is latched in on a side of the connecting element 28 situated opposite the base section 220 in the assembled state of the assembly 10. The locking bar 218 is provided with a stop surface 219, which extends along its outer peripheral surface and is arranged in such a way that it rests against the fastening extension 51 on the side thereof facing the base section 220 when the assembly 10 is fully assembled.

A hole 214 open toward the recess 60 is formed in the hydraulic block 18 (cf. FIG. 19). The hole 214 is arranged in such a way that the locking bar 218 engages in the hole 214 when the assembly 10 is in its assembled state, in which the latching arms 222 are latched in on the connecting element 28, in particular on a side of the connecting element 28 situated opposite the base section 220. Here, the latching arms 222 form a retention device, which holds the locking bar 218 in engagement with the hole 214. In this state, the central axis of the hole 214, the central axis of the through opening 212 and the central longitudinal axis A of the locking bar 218 are in alignment with one another, wherein the locking bar passes through the through opening 212. The central longitudinal axis of the connecting element 28 is aligned perpendicularly to the central longitudinal axis A of the locking bar 218 when the assembly 10 is in the assembled state thereof.

In other respects, the assembly 10 from FIGS. 11, 12 and 13a-d can have all the features of the assemblies 10 from FIGS. 7 to 10.

FIGS. 14 to 19 show an assembly 10 according to a fifth embodiment, which differs from the assembly 10 shown in FIGS. 11, 12 and 13a-d in that, instead of a locking bar 218, its coupling element 216 has two substantially identical locking bars 218, which are spaced apart. Both locking bars 218 of this assembly 10 have the same features as the locking bar 218 of the assembly from FIG. 11. In particular, each of the two locking bars 218 has a stop surface 219, which extends along its outer peripheral surface. The stop surfaces 219 are arranged in such a way that they rest against the fastening extension 51 when the assembly is in its assembled state. Moreover, each of the locking bars 218 passes through a through opening 212, which is formed in the fastening extension 51, is associated with the respective locking bar 218, and is in engagement with a respective hole 214 formed in the hydraulic block 18 and open toward the recess 60.

In other respects, the assembly 10 from FIGS. 14 to 19 can have all the features of the assemblies 10 from FIGS. 11, 12 and 13a-d.

Figure 11:
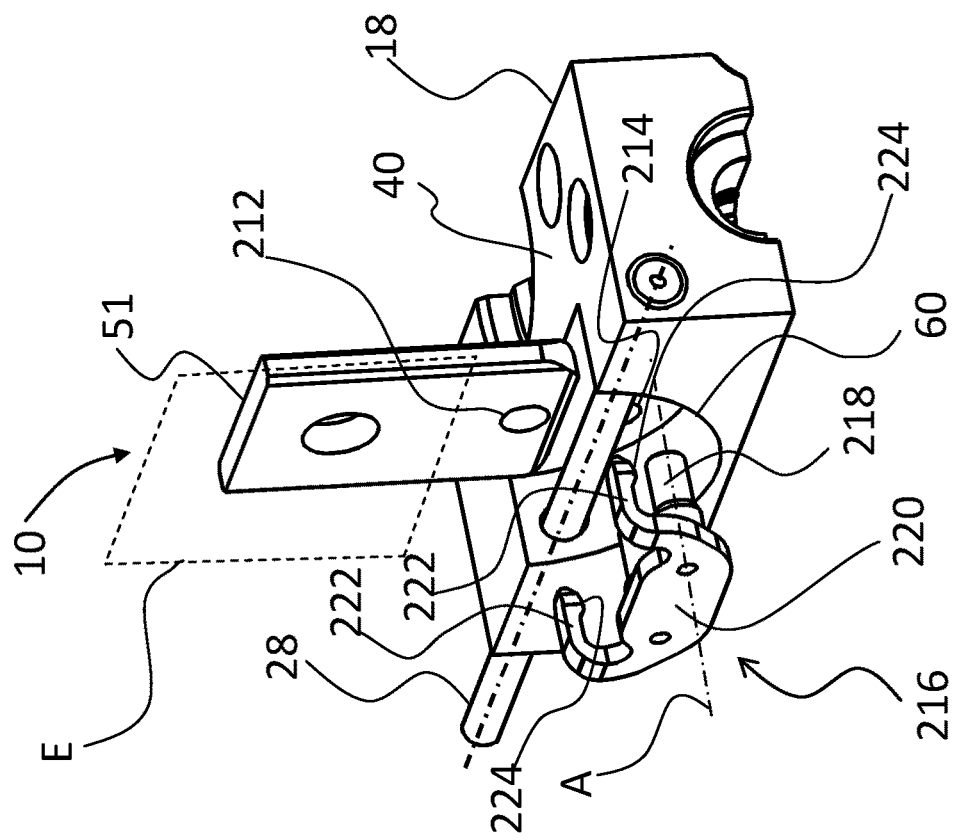
FIG. 11 shows a fourth embodiment of an assembly in a perspective partial view from the front, wherein the coupling element is illustrated in the state separated from the connecting element.
Figure 14:
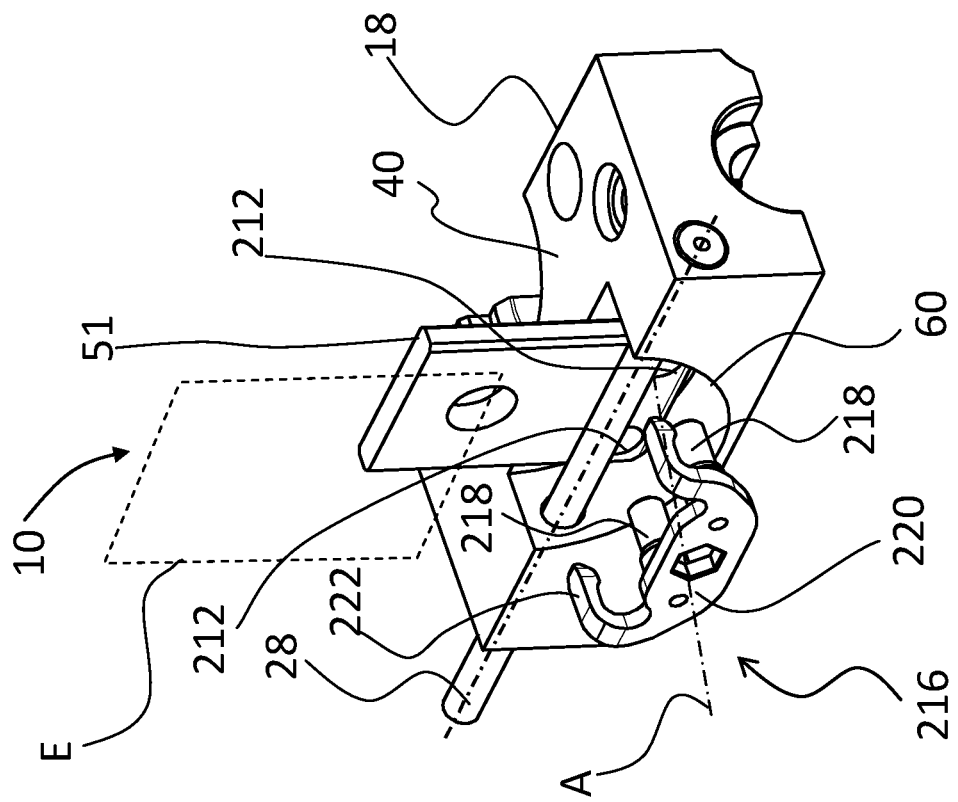
FIG. 14 shows a fifth embodiment of an assembly in a perspective partial view from the front, wherein the coupling element is illustrated in the state separated from the connecting element.
Figure 18:
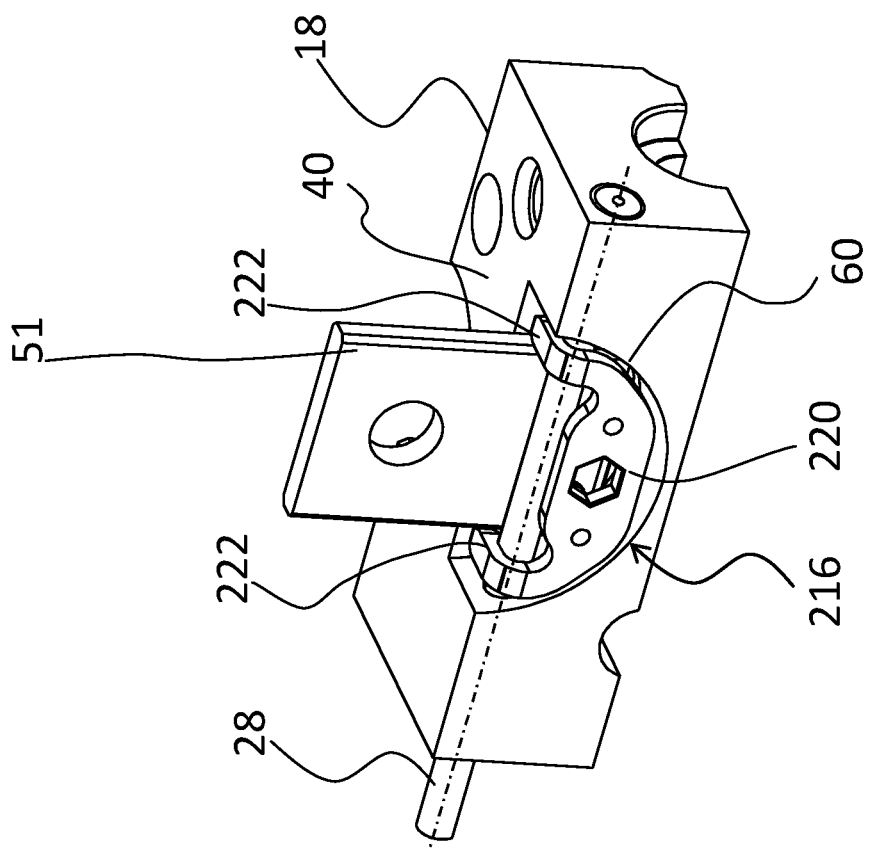
FIG. 18 shows the assembly from FIG. 14 in a perspective partial view, wherein the assembly is in the assembled state thereof.
Figure 17:
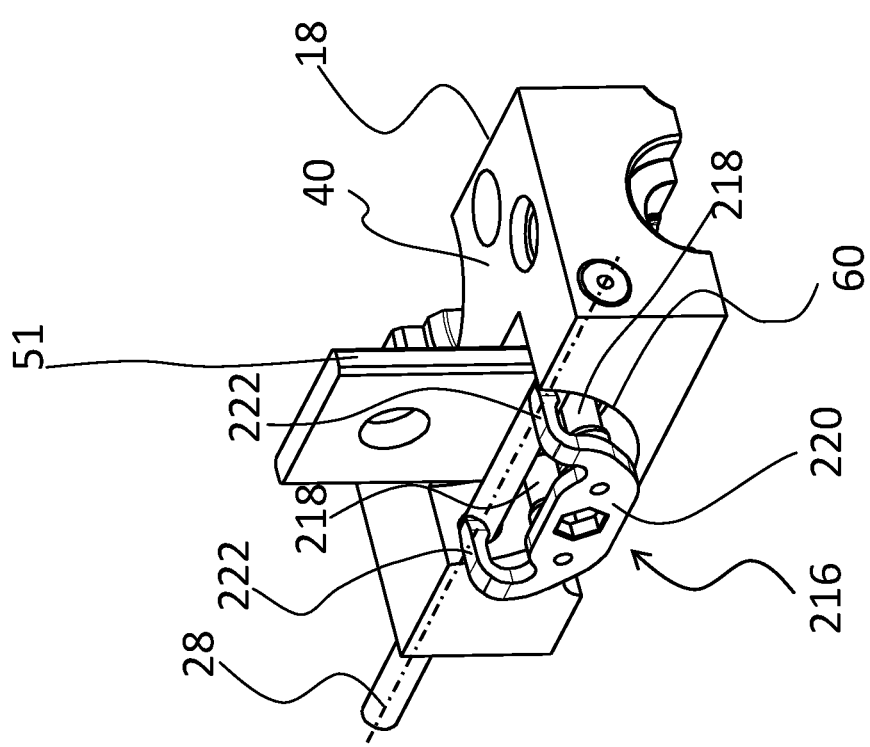

In order to mount the fluid container 12 on the hydraulic block 18 in the assembly 10 from FIG. 11 or the assembly 10 from FIG. 14, the fastening extension 51 connected to the fluid container is introduced into the recess 60 between the connecting element 28 and the hydraulic block 18 in such a way that the through openings 212 are in alignment, in each case along a common axis, with the associated holes 214 open toward the recess 60. The coupling element 216 is then moved into the recess 60, with the result that each locking bar 216 enters the through opening 212 associated therewith and enters into engagement with the hole 214 associated with the locking bar 216. In this case, the latching noses 224 of the latching arms 222 make contact with the connecting element 28, are deflected out of their rest position shown in FIGS. 11 and 14 and, after overcoming the connecting element 28, latch in on said element. In the end position of the coupling element 216 illustrated in FIGS. 18 and 19, the latching arms 222 therefore engage around the connecting element on the side thereof facing away from the locking bars 218, wherein the stop surface 219 rests against the fastening extension 51.

An assembly 10 according to a sixth embodiment, which is shown in FIGS. 20 and 21a-c, differs from the assembly 10 shown in FIGS. 14 to 19 in that the latching arms 222 engage on the fastening extension 51 and not on the connecting element 28. For this purpose, the fastening extension 51 is provided with notches 226, 227, through which the latching arms 222 pass when the latching arms 222 are latched in. The notches 226, 227 extend in a direction perpendicular to the main plane E through the fastening extension and are arranged on the longitudinal edges 228, 230 thereof. When viewed in the main plane E, the notches 226, 227 can have a U-shaped profile.

In other respects, the assembly 10 from FIGS. 20 and 21a-c can have all the features of the assembly 10 from FIGS. 11, 12 and 13a-d.

Although the coupling element 216 has two latching arms 222 in all the embodiments disclosed here, these latching arms 222 can be formed integrally with one another. In other words, one of the latching arms 222 can extend in a direction perpendicular to the central longitudinal axis A as far as the other latching arm 222. Moreover, it should be noted that (in the assembled state) all the locking bars described here can advantageously be arranged closer to the center of the base section than the latching arms 222 in a plane parallel to the main plane E, parallel to the main direction of extent of the connecting element 28 (cf. FIGS. 13a and 16a). If the coupling element 216 has just one locking bar 218, this is preferably positioned centrally on the base section 220.

In a modification (not shown in the figures) of the assembly 10 from one of FIGS. 1 to 10, the one-piece connecting element 28 connects the fluid container 12, the electric motor 26 of the brake pressure control device and the second housing 20 to one another in the assembled state of the assembly 10. Thus, the electric motor 26 and the fluid container 12 are fastened to the second housing 20 by means of the connecting element 28. The connecting element 28 can be arranged at a distance from the first housing 16. In this case, the first housing 16 is fastened to the second housing 20 by additional connecting means.

The invention claimed is:

1. An assembly (10) for a hydraulic brake system having a fluid container (12) for a brake fluid,
an electronic control unit (14) with a first housing (16),
a hydraulic block (18) with a second housing (20), and a brake pressure control device, which is arranged at least partially in the second housing (20), wherein the second housing (20) has a first fluid port for connection to the fluid container (12) and a second fluid port (24) for connection to a hydraulic line of the brake system, wherein the brake pressure control device is designed to pressurize the brake fluid, and
a fastening device (22) for fastening the fluid container (12) and the electronic control unit (14) to the hydraulic block (18),
wherein the fastening device (22) has a one-piece connecting element (28), which, in the assembled state of the assembly (10), connects the second housing (20) to the first housing (16) and/or to an electric motor of the brake pressure control device, and
wherein both the fluid container (12) and the first housing (16) or the electric motor are attached to the second housing (20) by means of the connecting element (28).

2. The assembly as in claim 1, wherein the one-piece connecting element (28) furthermore connects the fluid container (12) to the second housing (20) and to the first housing (16) and/or the electric motor in the assembled state of the assembly (10).

3. The assembly as in claim 1, wherein the connecting element (28) is a bolt or a rivet.

4. The assembly as in claim 1, wherein the connecting element (28) is designed to lock the fluid container (12) to the hydraulic block (18).

5. The assembly as in claim 1, wherein the connecting element (28) passes partially through the fluid container (12), the first housing (16) and/or the second housing (20).

6. The assembly as in claim 1, wherein the connecting element (28) is a bolt with an external thread, and wherein an internal thread (34), in which at least a section of the bolt is received, is formed in the first housing (16).

7. The assembly as in claim 1, wherein the fastening device (22) has one or more fastening extensions (50, 52, 54, 56; 51), which each engage in a corresponding recess (60, 62, 64, 66) formed in the second housing (20).

8. The assembly as in claim 7, wherein some of the fastening extensions (50, 52, 54, 56; 51) are arranged on opposite sides of the fluid container (12), and/or wherein one or more of the fastening extensions (50, 52, 54, 56; 51) is/are formed integrally with the fluid container (12).

9. The assembly as in claim 7, wherein each recess is formed in the region of an edge (68, 72) of the second housing (20) and is open toward a first surface (44) of the second housing (20) and toward a second surface (70) of the second housing (20),
wherein the first surface (44) extends at an angle to the second surface (70).

10. The assembly as in claim 7, wherein the connecting element (28) passes through one or more of the recesses (60, 62, 64, 66) and/or through one or more of the fastening extensions (50, 52, 54, 56).

11. The assembly as in claim 1, wherein the fastening device (22) has a frame (46), which is arranged on an end of the fluid container (12) which faces the hydraulic block (18), and wherein the frame (46) is designed as a separate component.

12. The assembly as in claim 11, wherein one or more of the fastening extensions (50, 52, 54, 56; 51) is/are formed integrally with the frame (46) and/or projects/project laterally from the frame (46).

13. The assembly as in claim 7, wherein at least one of the fastening extensions (51) has a through opening (212), the hydraulic block (18) has a hole (214) which is open toward the recess (60) and the fastening device (22) has a coupling element (216) having at least one locking bar (218), and wherein, in the assembled state of the assembly, the hole (214) is in alignment with the through opening (212) along a central longitudinal axis (A) of the locking bar (218), and the locking bar (218) passes through the through opening (212) and is in engagement with the hole (214).

14. The assembly as in claim 13, wherein the fastening extension (51) is designed as a flat tab.

15. The assembly as in claim 13, wherein the coupling element (216) has a retention device, which is designed to hold the locking bar (218) in engagement with the hole (214) in the assembled state of the assembly, and wherein the retention device is preferably designed to engage on the connecting element (28) or on the fastening extension (51).

16. The assembly as in claim 15, wherein the retention device has at least one latching arm (222), which is connected to the locking bar (218) via a base section (220) and which is designed to engage on the connecting element (28) or on the fastening extension (51) in the assembled state of the assembly.

17. The assembly as in claim 16, wherein, in the assembled state of the assembly, the connecting element (28) is arranged between the base section (220) and the fastening extension (51) and/or between the latching arm (222) and the locking bar (218).

18. The assembly as in claim 16, wherein the locking bar (218) extends substantially parallel to the latching arm (222) and/or is spaced apart from the latching arm (222).

19. The assembly as in claim 16, wherein the latching arm (222) is elastic, at least in some section or sections.

20. The assembly as in claim 13, wherein the coupling element (216) has a plurality of locking bars (218) and/or a plurality of latching arms (222).

21. The assembly as in claim 13, wherein a central longitudinal axis of the connecting element (28) is aligned perpendicularly to the central longitudinal axis (A) of the locking bar when the assembly is in the assembled state thereof.

22. The assembly as in claim 13, wherein the coupling element (216) and the connecting element (28) are formed separately from one another.

23. A vehicle brake system having an assembly (10) as in claim 1.

* * * * *